(12) United States Patent
Muhonen

(10) Patent No.: US 6,751,472 B1
(45) Date of Patent: Jun. 15, 2004

(54) CELL SELECTION IN A PACKET RADIO NETWORK

(75) Inventor: Ahti Muhonen, Hirvihaara (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/700,588

(22) PCT Filed: May 18, 1999

(86) PCT No.: PCT/FI99/00431

§ 371 (c)(1), (2), (4) Date: Jan. 12, 2001

(87) PCT Pub. No.: WO99/60794

PCT Pub. Date: Nov. 25, 1999

(30) Foreign Application Priority Data

May 20, 1998 (FI) .................................................. 981130

(51) Int. Cl.⁷ ................................................ H04M 1/00
(52) U.S. Cl. ................................ 455/553.1; 455/432.1; 455/435.1; 370/352; 370/329; 370/465
(58) Field of Search ......................... 455/432.1, 435.1, 455/466, 553.1, 434, 435.3, 509, 437, 426.1, 436; 370/329, 352, 465, 466

(56) References Cited

U.S. PATENT DOCUMENTS

| | | | |
|---|---|---|---|
| 5,930,721 A | * | 7/1999 | Fried et al. |
| 6,005,852 A | * | 12/1999 | Kokko et al. |
| 6,016,428 A | * | 1/2000 | Diachina et al. |
| 6,047,180 A | * | 4/2000 | Coutant |
| 6,163,694 A | * | 12/2000 | Lind et al. |
| 6,400,946 B1 | * | 6/2002 | Vazvan et al. |

FOREIGN PATENT DOCUMENTS

| | | |
|---|---|---|
| EP | 0 831 669 | 3/1998 |
| GB | 2 301 992 | 12/1996 |
| WO | WO 95/21492 | 8/1995 |

* cited by examiner

*Primary Examiner*—Marsha D. Banks-Harold
*Assistant Examiner*—Nghi H. Ly
(74) *Attorney, Agent, or Firm*—Pillsbury Winthrop LLP

(57) ABSTRACT

A method controls the operation of a mobile station, the operation including camping which modellable as a number of states (S1 to 4) with predetermined state transitions (S12–S34) between them. Each one of the states corresponds to a set of locally varying features which the mobile station currently supports. The features include a first feature indicating whether the mobile station is in circuit-switched mode or packet switched mode, and a second feature indicating whether or not the mobile station is in localized service area (LSA) model. For all combinations of the first and second features there is a corresponding state (S1 to S4), and for each one of these states there are two originating state transitions and two terminating state transitions, each one of the originating state transitions corresponding to a change in the respective feature.

14 Claims, 2 Drawing Sheets

CELL SELECTION IN A PACKET RADIO NETWORK

This application is the national phase of international application PCT/FI99/00431 filed May 18, 1999 which designated the U.S.

BACKGROUND OF THE INVENTION

The invention relates to cell selection in a mobile telecommunications network which comprises a packet radio network. An example of such networks is a combined GSM/GPRS network.

A mobile station (MS) in a cellular system, when switched on, selects the most suitable cell. Later, when the MS is in idle mode (i.e. not having a call in progress) and it is camped normally on a cell of the selected PLMN, it monitors its neighbouring cells for a possible handover, in case one of the neighbouring cells provides better service. This process is called cell reselection. The GSM/GPRS cell reselection chapters are based on ETSI recommendations GSM 03.22, GSM 03.60, GSM 03.64 and GSM 05.08. These recommendations are incorporated herein by reference, but for convenience, the parts of those documents which are essential for understanding the invention are repeated in this application.

Cell reselection in GSM

A cell reselection can be triggered if a path loss criterion parameter C1 indicates that the path loss to the cell has become too high; or the current serving cell has become barred; or there is a better cell in terms of the cell reselection parameter C2 in the same LA, or a much better cell in another LA of the selected PLMN. There are other reasons for a cell reselection but they are not essential for understanding the invention (such as a downlink signalling failure, or a random access attempt fails after a certain number of repetitions).

The MS will reselect a new cell in order to achieve the following conditions which are commonly referred to as a "normal service state": a) The registered PLMN is the selected PLMN; b) The MS is camped on a suitable cell of the LA on which the last successful LU was performed, and that cell has the highest value of C2 for any unbarred cell in that LA; c) The value of C2 for the MS is not lower than the value of C2 for any suitable cell in another LA of the selected PLMN by more than the hysteresis value CRH (Cell Reselect Hysteresis).

There may be temporary conditions under which not all these are fully satisfied, e.g., during cell selection on a PLMN or while in the process of reselecting another cell. However, if the above cannot be satisfied for a certain period of time, the MS will normally enter a limited service state in which it will try to camp on an acceptable cell. In this state, only emergency calls are possible.

Parameters C1 and C2 are used to ensure that the MS is camped on the cell with which it has the highest probability of successful communication on uplink and downlink. The MS uses C1 to determine whether a cell is suitable to camp on, C1 depends on 4 parameters: i) RLA (Received Level Average) is the received signal level suitably averaged; ii) RXLev_Access_Min which is broadcast on the BCCH, and is related to the minimum signal that the operator wants the network to receive when being initially accessed by an MS; iii) MS_TXPWR_MAX_CCH which is also broadcast on the BCCH, and is the maximum power that an MS may use when initially accessing the network; and iv) P which is the maximum power of the MS.

Use of the parameter C1 enables the MS to determine whether communication is possible with the network in the absence of interference. However, an additional safeguard against interference is used. This is to monitor the success rate of the MS in decoding signalling blocks of the paging subchannel. If there is a downlink signalling failure, i.e. the success rate drops too low, this indicates probable interference on the downlink, and the MS attempts to find another suitable cell. The path loss criterion parameter C1 used for cell selection and reselection is defined by:

$$C1 = (A - Max(B,0)),$$

where $$A = RLA - RXLev\_Access\_Min$$

$$B = MS\_TXPWR\_MAX\_CCH - P$$

All values are expressed in dBm. The path loss criterion is satisfied if $C1>0$.

In order to optimize cell reselection, additional cell reselection parameters can be broadcast on the BCCH of each cell. The cell reselection process employs a parameter C2 that depends on these parameters. The parameters used to calculate C2 are as follows:

Cell_Reselect_Offset which applies an offset to the C2 reselection criterion for that cell.

Penalty_Time: When the MS places the cell on the list of the strongest carriers, it starts a timer, which expires after the Penalty_Time. This timer will be reset when the cell is taken off the list. For the duration of this timer, C2 is given a negative offset (Temporary_Offset). This will tend to prevent fast moving MSs from selecting the cell. The all ones bit pattern on the Penalty_Time parameter is reserved to change the sign of Cell_Reselect_Offset and the value of Temporary_Offset is ignored as indicated by the equation defining C2.

Temporary_Offset which applies a negative offset to C2 for the duration of Penalty_Time after the timer T has started for that cell. An infinite value can be applied, but a number of finite values are also possible.

Timer T is implemented for each cell in the list of strongest carriers. T is started from zero at the time the cell is placed by the MS on the list of strongest carriers, except when the previous serving cell is placed on the list of strongest carriers at cell reselection. In this, case, T is set to the value of Penalty_Time (i.e. expired).

The reselection criterion C2 is used for cell reselection only and is defined by:

$$C2=C1+Cell\_Reselect\_Offset\_Temporary\_Offset*H(Penalty\_Time-T) \text{ for Penalty-Time} < >11111$$

$$C2=C1-Cell\_Reselect\_Offset \text{ for Penalty\_Time}=11111$$

for non-serving cells:

$$H(x)=0 \text{ for } x<0; \text{ and } H(x)=1 \text{ for } x>=0; \text{ and for serving cells: } H(x)=0$$

Cell reselection in GPRS

In order to receive GPRS service, a cell reselection may be required. When the MS is in GPRS Idle state and it wishes to initiate a GPRS attach procedure, the following applies. If the currently camped-on cell supports GPRS then no cell reselection is required. If the currently camped-on cell does not support GPRS, then reselection of a cell supporting GPRS is required before execution of the attach procedure. If, however, the MS is in GPRS Standby or Ready state, cell selection and reselection procedures specific to GPRS are used (GPRS mode). Instead of the parameters C1 and C2, a GPRS MS applies the corresponding GPRS parameters C31 and C32, if provided. If the MS is in active mode, then the changes from one cell to another is performed according to the GSM handover procedures.

In GPRS Standby and Ready states, the MS performs cell reselection, except for a class A MS while in a circuit switched connection, in which case the cell is determined by the network according to the GSM handover procedures. The GPRS mode cell reselection procedures apply to the MSs attached to GPRS if a PBCCH (Packet Broadcast Control Channel) exists in the serving cell. Otherwise the MS shall perform cell reselection according to the GSM idle mode procedures. Optionally, the network may control the cell selection.

The cell reselection criteria C31 and C32 are provided as a complement to the current GSM cell reselection criteria. This provides a more general tool to make cell planning in GPRS as similar as possible to existing cell planning in GSM. The GPRS specific cell reselection algorithm is only applicable if the PBCCH is allocated. If the PBCCH is not allocated, the MS shall perform cell reselection according to the C2 criteria. The following cell reselection steps shall be followed, wherein (s) and (n) denote serving cell and neighbor cell respectively: 1) Path loss criterion (C1). The path loss criterion C1>=0, is used as a minimum signal strength criterion for cell selection for GPRS in the same way as for GSM in Idle mode. 2) Signal strength threshold criterion (C31) for hierarchical cell structures (HCS). 3) Cell ranking (C32). 4) Cell reselection rules.

The MS selects the cell having the highest C32 value among those having the highest priority class and fulfilling the criterion C31>=0. The priority classes may correspond to different HCS layers. They may also be used for other purposes. If no cells fulfil the criterion C31>=0, the MS selects the cell having the highest C32 value among all cells.

The HCS signal strength threshold criterion (C31) is used to decide whether the cell is qualified for prioritized hierarchical cell reselection.

C31(s)=RLA(s)−HCS_THR(s)>=0, (serving cell)
C31(n)=RLA(n)−HCS_THR(n)>=0, (neighbour cell)

where HCS_THR is the signal threshold for applying HCS reselection.

The cell ranking criterion (C32) is used to select cells among those with the same priority:

C32(s)=C1(s)+GPRS_Reselect_Offset(s), (serving cell)
C32(n)=C1(n)+GPRS_Reselect_Offset(n)−Temporary_Offset(n)*H(Penalty_Time(n)−T(n)), (neighbour cell)

where GPRS_Reselect_Offset applies an offset and hysteresis value to each cell;

$$H(x)=0 \text{ for } x<0; \text{ and } H(x)=1 \text{ for } x>=0$$

Network Controlled Cell Reselection

It is possible to order an MS in Ready state to send a measurement report to the network. The measurement report is a regular packet transmission, addressed to the proper network entity. It also is possible for the network to order an individual MS in Ready state to perform cell reselection to a cell appointed by the network, possibly in combination with a penalty parameter to keep the MS from returning to the original cell immediately. A network induced cell reselection temporarily overrides the MS originated cell reselection.

The degree to which the mobile station shall resign its radio network control is variable, and is specified in detail by the parameter Network_Control_Order. The following actions are possible to order to the mobile stations. NC0: normal MS control (the MS performs autonomous cell reselection); NC1: MS control with measurement reports (the MS sends measurement reports to the network according to additional information in the message NC1. It continues its normal cell reselection. NC2: Network control (the MS sends measurement reports to the network according to additional information in the message NC2. It performs no cell reselection on its own, and can only make a cell reselection according to a cell reselection command received from the network.

Two sets of parameters are broadcast on PBCCH and are valid in Transfer and Wait states respectively for all mobile stations in the cell. Network_Control_Order can also be sent individually to an MS on PACCH, in which case it overrides the broadcast parameter.

The measurement reports are sent individually from each MS as RLC transmissions, addressed to the RR management in a BSS. The measurement reporting is maintained in the MS RR states Wait with Cell Update and Transfer and in the BSS RR states Measurement Report Reception and Transfer.

The cell reselection commands include: 1) target cell channel description (GSM 04.08); 2) penalty to prevent immediate return (3 bits); and 3) penalty timer (5 bits).

There may appear exceptional situations where the network controlled cell reselection procedures (NC1 or NC2 modes of operation) should not be used:

1. When a class A mobile station is simultaneously involved in a circuit switched service and in a GPRS transfer. In this case, handover for the circuit switched service has precedence over GPRS network controlled cell reselection. In order to avoid that measurements are reported twice by the MS (once for the GPRS resource, once for the circuit switched resource), thus leading to inefficient usage of the radio bandwidth, network controlled cell reselection should not be activated in this case. 2. When an MS is performing a process called Anonymous Access, cell reselection implying a change of routing area results in the MS returning to the GPRS MM Idle state. Therefore, there might be cases where the network controlled cell reselection would result in a failure of the Anonymous Access.

Since the BSS is not able to detect such situations, the MS must inform the BSS when such a situation is encountered, so that the BSS can select a more appropriate mode of operation. This coordination procedure is as follows. When an MS in Transfer or Wait state has been asked by the network to behave according to the NC1 or NC2 modes of operation and the MS encounters one of the above mentioned situations, it continues reporting measurements and it will not obey the network controlled cell reselection commands, if received. As soon as an uplink transmission opportunity occurs, the MS informs the network that the requested mode of operation should be suspended. It is up to the network to decide whether to maintain or to change the mode of operation. The network replies with the value to be used. The MS adapts its behaviour accordingly. If no answer is received from the network, the MS assumes no change and continues to inform the network, as described above, until an answer is received.

When the situation which triggered the above mentioned actions ends, and provided that the MS is still in Transfer or Wait state, as soon as an uplink transmission opportunity occurs, the MS informs the network that the initial mode of operation (NC1 or NC2) may resume. It is up to the network to decide whether to maintain or to change the mode of operation. The network replies with the value to be used. The MS adapts its behaviour accordingly. If no answer is received from the network, the MS assumes no change (i.e. it continues to apply the last value received from the network) and it continues to inform the network, as described above, until an answer is received.

Localized Service Areas (LSA)

In cellular mobile communications systems, a mobile station may roam freely within the area of the mobile communications network and connect to the base transceiver station signal received best at a given time. Usually, all base transceiver stations provide substantially similar services for the mobile stations in a network. Some base transceiver stations can, however, be defined to provide a certain special service for all mobile stations of the network, e.g. call charges below the normal tariff. The base transceiver station broadcasts a message on such a special service on its broadcast control channel (BCCH), whereby mobile subscribers in the area note that they are within a special service area of the network and may take advantage of this service.

Within the context of this application, such special service areas are referred to as localized service areas (LSA) and the support of LSA is called SoLSA. A subscriber having SoLSA service is called a SoLSA subscriber. A mobile station currently having support for SoLSA is said to be in LSA mode. This could mean e.g. that the mobile station indicates to its user that certain special features (like lower rates or extra services) are available, and it uses these features when applicable. SoLSA for a GSM environment is described in a proposal to ETSI (European Telecommunication Standard Institute), document Tdoc 98S147. For convenience, the subject matter of the '147 document is repeated here in a somewhat rearranged form.

Within the GSM standards there are features and capabilities defined which allow groups of subscribers to be managed according to a number of operator specific criteria, e.g. CAMEL, USSD, SIM Application Toolkit (SAT) and "Multiple Subscriber Profile". Future trends in GSM system platform development are towards customised system solutions where, for example, radio access solutions will be enhanced to take into account indoors environment (micro and picocells) such as office buildings. New means to provide radio access solutions together with service and tariff packages (e.g. flat rate charging) can be introduced.

The concept of LSA extends the operator's capability to offer different service features to subscribers or subscribers groups, different tariffs and different access rights depending on the location of the subscriber. Examples of LSAs are indoors office cells (those provided by indoors base stations); a home or an office and its neighbourhood, an industry area (covering all company buildings and the space between), or a part of a city or several locations.

Support of LSA (SoLSA) can be specified as a set of service features which are used in conjunction with existing toolkits, e.g. CAMEL and SAT. For example CAMEL phase 2 functionality already provides the means to offer cell based applications, as a CAMEL Service Environment (CSE) can be aware of the cell from which a call was originated. CSE capabilities include e.g. modified charging and barring of calls based on cell information. However, operators typically have several service platforms. It should be noted that CAMEL is but one example of a platform for the SoLSA concept.

SoLSA can enhance radio specific support for an LSA by standardising one or more of the following: definition of an LSA, LSA indication, LSA support (in idle mode (camping), or in active mode (handover)), LSA only access, exclusive access, and preferential access.

FIG. 1 shows the parts of the mobile network system that are essential for understanding the invention and FIG. 2 illustrates the concept of SoLSA. Subscriber-specific LSA information can be stored and managed either in the CSE or in the Home Location Register HLR. Two types of LSAs can be foreseen, either a truly customised LSA for a small office area and a residential area ("office/home zone"), or a predefined LSA covering large campuses, sections of cities and districts ("city zones") etc. These two LSAs fulfil different needs. They complement each other and they can be used simultaneously. A SoLSA subscriber can have a home LSA consisting of 1 or 2 cells; an office LSA consisting of 1 to 5 cells and a city LSA with dozens or hundreds of cells. The first two LSAs are preferably tailored on a per-subscriber basis. A truly subscriber-specific LSA can be defined on a cell identity basis and it is possible to define it as small as possible, consisting of even only one cell, if necessary. The third LSA could rely on a certain predefined LSA definitions. LSA information can consist of:

- List of cell identities belonging to an LSA (Cell identity can be defined as specified in GSM 08.08, e.g.: Cell Global Identity (MCC+MNC+LAC+Cl), MNC+LAC+Cl LAC+Cl or Cl).
- LSA_ID (The LSA ID is a number uniquely assigned to an area in one network. LSA ID can be associated with a Cell Identity list.)
- LSA name (a text string describing area and/or service, e.g. "Etsi Building").
- LSA indication (a flag to activate/deactivate LSA indication)
- LSA priority (a number value needed to support overlapping LSAs, for example city zone and office cells in same area).
- LSA only access (Service outside LSAs is restricted).
- LSA only access indication text (Text to be displayed when out of LSA area).
- Exclusive access (User has exclusive access to a LSA).
- Relevant MSP profile (an LSA may be associated with some MSP profiles).
- Idle/active mode support (preferred cell selection in idle/active mode may be utilised in an LSA).

Examples of LSA Information

LAC+Cl, "Home", Priority=3, MSP Profile 1

LAC+Cl, LAC+Cl, LAC+Cl, LAC+Cl, "Corporate", Priority=1, MSP Profile 2 (a user with two LSAs)

LSA_ID=1234, "Corporate", Priority=1, Excl_access=yes, Active mode support=mandatory MCC+MNC+LAC+Cl, MCC+MNC+LAC+Cl, "MoU at Fiji" Priority=2 (a user with exclusive access and LSA in VPLMN)

LSA Only Access=yes

OutOfLSA="No calls allowed"

LAC+Cl, LAC+Cl, LAC+Cl, LAC+Cl, "Corporate", (a user with limited mobility)

The subscriber's LSA information can be stored within the subscriber's SIM. This information can be initially stored by the operator for new subscribers. The operator can manage LSA information in a SIM by using SIM data download of SAT (SIM Application Toolkit), USSD (Unstructured Supplementary Service Data) or SMS (Short Message Service), by concatenating multiple short messages if necessary.

LSA information transfer from the CSE can take place any time. At least it takes place when the subscriber's LSA parameters are changed, e.g. due to possible changes in the radio network's configuration. The MS can receive the LSA information for cell reselection procedures etc.

Idle mode support makes the behaviour of the MS more consistent and reliable in an LSA. A preferential cell reselection mechanism can be defined so that when camping on a cell in idle mode (MS in SERV state), the subscriber's MS favours the cells belonging to his/her LSA. The MS shall always attempt to reselect a cell in a higher priority LSA. This requires new functionality in the MS. The MS can recognise the LSA by the LSA_ID or a cell id list stored in the SIM.

FIGS. 3 to 4 illustrate cell reselection in SoLSA. GSM phase 2 defines the above parameters C1 (for normal cell selection) and C2 for cell reselection). C2 is evaluated for the six strongest neighbouring cells, and the cell with the highest priority and C2 is reselected. If there are more than one LSA cell available which meet the reselection criteria, the highest LSA priority cell is selected.

For normal cells the calculation of C2 involves a parameter RXLev_Access_Min, but for LSA cells the LSA_RXLev_Access_Min is used instead. The value for the parameter is broadcast to the MS for each cell in the system information messages.

For SoLSA, a new parameter LSA_Camping_Margin is also broadcast to the MS for each cell in the system information messages. If the C2 of a lower priority LSA cell or a normal cell exceeds the C2 of an LSA cell by this margin, the LSA MS will no longer camp to the highest priority LSA cell even if its C1 is positive. This can be realised by adding LSA_Camping_Margin and (LSA_RXLev_Access_Min−RXLev_Access_Min) to the C2 of the LSA cells. This causes the MS to favour the LSA cells and minimises the negative effect of LSA mobiles on the network's spectral efficiency.

New parameters can be added to appropriate system information messages to enable broadcasting of the LSA cell reselection parameters. These new parameters are transferred to the BSS from the O&M with other radio network parameters. Existing cell reselection parameters will affect the behaviour of all GSM subscribers in the same way. For SoLSA, there is a need for customer-specific idle mode supporting parameters. This enables SoLSA to handle LSA customers in e.g. traffic hot spots and in office environments without affecting regular GSM customers.

A Base Station Controller BSC needs subscriber-specific LSA information to favour LSA cells during active mode. This information can be delivered to the BSC from an MSC (Mobile services Switching Centre) during call setup and inter-BSC handover by using existing BSSAP messages or proprietary messages. The LSA information should identify the LSA cells, LSA priorities and the LSA-only access indicator. The MSC can retrieve the LSA information from the CSE or from the Visitor Location Register VLR, if available.

During inter-BSC handover, the LSA information can be delivered from the source BSC to the target BSC by including the LSA cell list to the HANDOVER_REQUEST and HANDOVER_REQUIRED messages (each of which will require a new information element). The transfer of the LSA information between the BSSs is transparent to the MSC.

A subscriber-specific identifier can be assigned to each LSA (e.g. an alphanumeric text or an icon). This identifier can be provided to a user in idle or active mode. It is also possible to indicate a change of the LSA during idle and active mode. The indication is a network option (activated/deactivated by the network). When the subscriber moves into and away from his/her LSA, the LSA indication may be given by the MS, as guided by the LSA indication bit. In the idle mode the MS can indicate the LSA e.g. by displaying the LSA name string (e.g. "Etsi Building"), an icon, or another signal to the subscriber, as a result of camping on a LSA cell.

An exclusive access (EA) feature makes it possible to guarantee that the members of a user group are the only users of the radio channels (physical resources) within a cell. In order to support EA in idle mode, other users' mobile stations must be prevented from camping to that cell. This can be done by using a Cell_Bar_Access parameter. Users whose LSA the cell belongs to shall ignore the Cell_Bar_Access parameter and camp to an LSA cell normally. In order to bar the cell also for LSA users, a new broadcast parameter LSACell_Bar_Access can be used.

In order to support EA in active mode, handovers of non-EA LSA users to EA LSA cells should be prevented. This feature could be supported e.g. by flagging EA cells in the BSC and permitting handovers to EA cells only for users for whom a matching LSA id information is found in the LSA information delivered to the BSC. An LSA only access (LO) feature makes it possible to restrict the users' access to a defined area. Originating and/or-receiving calls outside that area can be prevented. It is also possible to prevent handovers to cells not belonging to allowed LSAs. In idle mode a MS with LO is only allowed to access cells that are defined in the subscriber's LSA information. All cells with no match with the LSA information stored in the SIM is regarded as not suitable. An indication can be given to the user (e.g. a text string like "No Service Allowed"). If LO is set and a non-LSA cell is-selected, only emergency calls are allowed.

To support LO during active mode, the BSC can compare each handover candidate cell with LSA information delivered to the BSC and permit handover only if a match is found. CAMEL CSE (or NSS) may be used to prevent call attempts (MO and/or MT) outside LSA area as required by SoLSA application.

Preferential access (PA) means the ability to favour the allocation of radio resources at call setup and during the active mode to LSA users. Allocation of resources could be achieved by defining a specific load alarm for PA cells in-the BSC. Upon triggering the alarm threshold, access to PA cells would be granted only to LSA subscribers. In call setup phase and in handovers, PA can be supported by using the LSA information delivered to BSC (see section Localised service area support in active mode). For Camel Service Environment (CSE), the following functionality is required from a SoLSA server: (1) storage and management of subscriber specific LSA information, (2) interface to service provision and management system, (3) LSA information transfer to the MS, (4) conformance with SIM Application Toolkit (class 1) data down load procedure, and (5) LSA information transfer to the MSC.

Using CAMEL platform provides a number of benefits. CAMEL Application Part (CAP) protocol is able to transfer the cell id to the CSE for LSA information processing during call setup. That would make it easy for any CAMEL application (e.g. tariff applications) to use SoLSA capability. CAMEL platform would also enable SoLSA based services to roaming subscribers.

To support SoLSA, the MS and the SIM must support SIM Application Toolkit (class 1). The MS must also have: support a subscriber-specific LSA indication; LSA support in idle mode (decoding and processing of new SoLSA specific system information parameters and LSA specific cell reselection algorithm); LSA support for EA in Idle state (ignore Cell_Bar_Access bit while in LSA and support decoding and processing of LSACell_Bar_Access bit while in LSA); and LSA support for LSA only access in Idle state (indication to subscriber when not in an LO cell).

The BSC must support: LSA in active mode (reception and proccessing of LSA information during call setup, storage and execution of an LSA favouring algorithm, and transfer of LSA information between BSCs during external handovers); EA; LO; and PA.

A problem associated with the above-mentioned embodiment for providing special services in a network is that SoLSA is only defined for circuit-switched connections, i.e. GSM and its derivatives. In a dual mode GSM/GPRS network, the coverage of GSM and GPRS services may be different. Thus the prior art SoLSA provides little or no support for packet-switched connections, e.g. GPRS. A specific problem with the prior art GSM SoLSA is encountered when a dual-mode mobile station with SoLSA active is involved in a GPRS connection. In such a situation, SoLSA support is discontinued because GPRS cell reselection does not take SoLSA into account.

A straightforward solution would be to mirror the GSM SoLSA to the GPRS service. However, such a straightforward solution would involve several interworking problems which do not exist at all if SoLSA is implemented for GSM only. For example, in GSM-only SoLSA, the MS is in SoLSA state if the network supports it. Obviously, a dual-mode MS should be in SoLSA state if both networks (GSM and GPRS) support it. However, difficult decisions are encountered if only one network supports SoLSA, or if the MS can barely receive a BTS supporting GPRS SoLSA but it receives well a BTS supporting GSM SoLSA.

BRIEF DESCRIPTION OF THE INVENTION

An object of this invention is to develop methods and network elements for overcoming the above problems. The object is achieved by means of methods and transceivers which are characterized by what is disclosed in the characterizing part of the appended independent claims. Preferred embodiments of the invention are specified in the dependent claims.

In the following, 'transceiver' refers commonly to a mobile station MS or that part of a land-based mobile network (BTS/BSC or RNC) which is serving that MS. 'Dual-mode' refers to a transceiver supporting both circuit-switched and packet-switched connections. GSM and GPRS will be used as well-known examples of circuit-switched and packet-switched connections respectively, but the invention is not limited to these two embodiments. The invention is based on the idea that a dual-mode transceiver can be modelled as a state diagram, as shown in FIG. 5. The state diagram has four states, as follows: State S1 is GSM Idle (non-SoLSA) state, state S2 is GSM SoLSA, State S3 is GPRS Ready or Standby state and state S4 is GPRS SoLSA. FIG. 5 also shows the corresponding transitions $T_{12}, T_{13}, \ldots T_{34}$ between the states S1 to S4.

State transitions $T_{12}$ and $T_{34}$ correspond to a positive finding of SoLSA. The reverse transitions $T_{21}$ and $T_{43}$ correspond to negative finding of SoLSA. The State transitions $T_{13}$ and $T_{24}$ relate to the GPRS attach procedure and state transitions $T_{13}$, and $T_{24}$ relate to the GPRS detach procedure.

In retrospect, constructing the state diagram of FIG. 5 may seem rather straightforward, considering that states S1 to S3 exist in prior art system. However, a corresponding prior art state diagram would be trivial as state S4 and half of the state transitions are omitted, i.e. all transitions to/from state S4. Thus, it can be said that the invention is also based on developing well-determined criteria and/or priorities for these state transitions.

Preferably, the criteria for the state transitions are based on the fact that of the two communications modes, i.e. circuit-switched and packet-switched, one has better coverage. In a combined GSM/GPRS system, GSM typically has better coverage than GPRS. Thus, in situations where there is a possible conflict between a state transition based on GSM criteria and a state transition based on GPRS criteria, it is advantageous to use the GPRS criteria to determine whether the mobile station is in SoLSA mode or not. Such a conflict may occur when the mobile station has an activated GPRS context (in Standby or Active state). In such a situation, the mobile station would not perform state transition $T_{12}$ unless $T_{34}$ is also possible.

The methods and network elements according to the invention extend the concept of SoLSA to packet radio network by solving the interworking problems of prior art systems.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
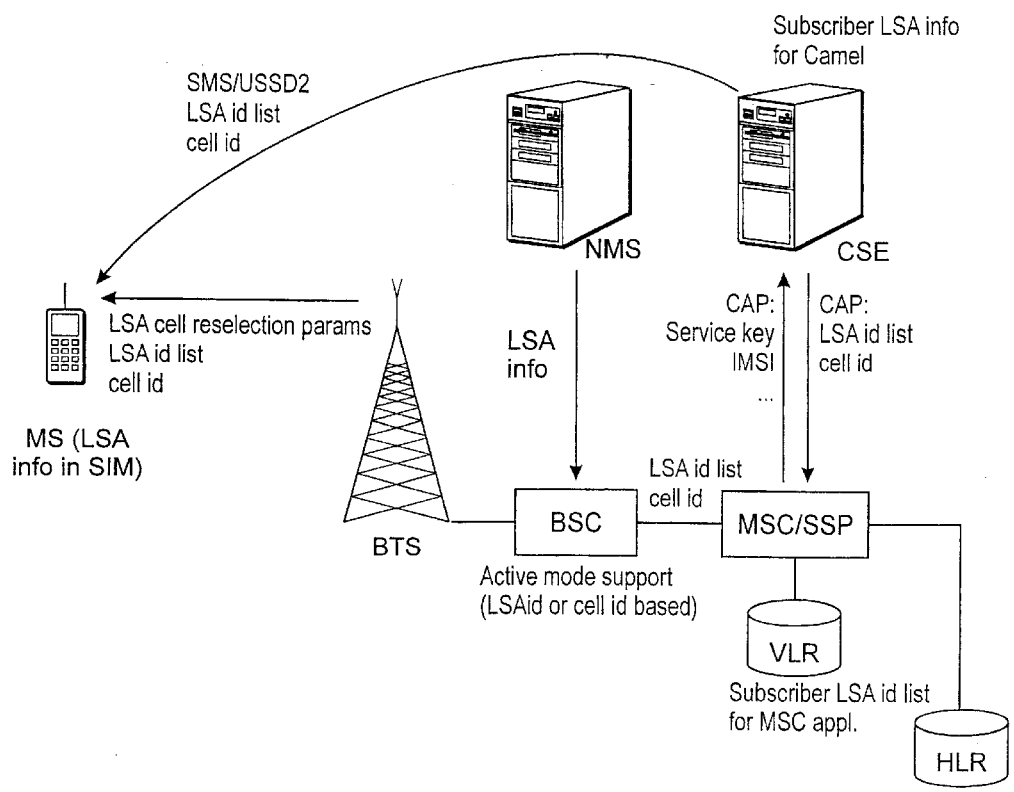
FIG. 1 shows the parts of the mobile network system that are essential for understanding the invention.
Figure 2:
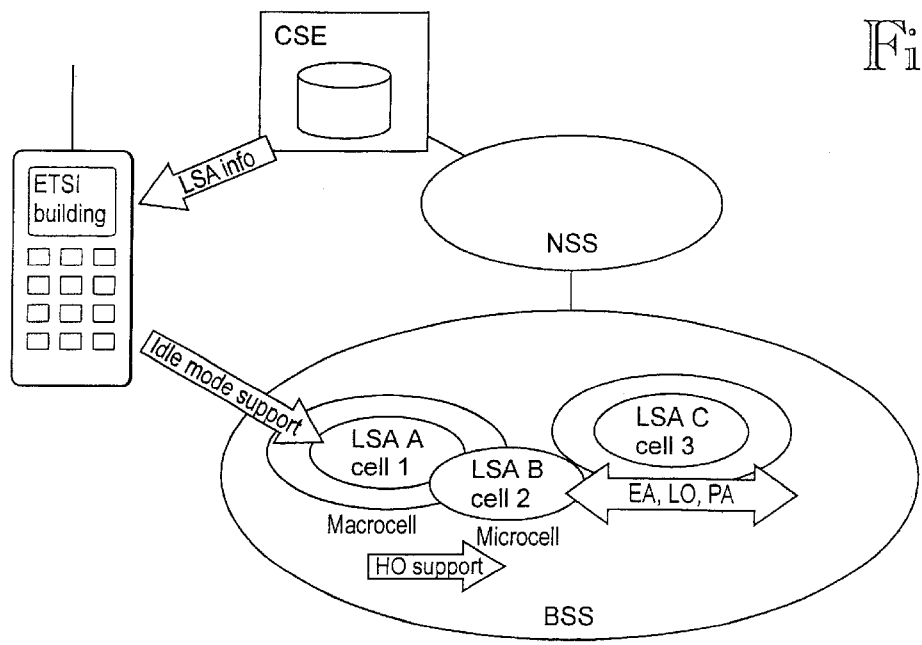
FIG. 2 illustrates the concept of SoLSA.
Figure 3:
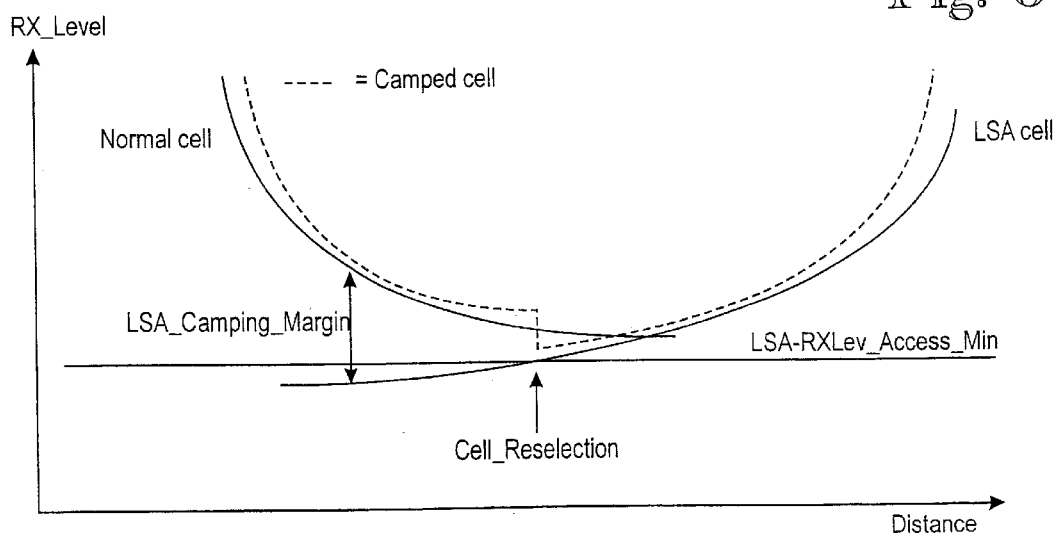
FIGS. 3 to 4 illustrate cell reselection in SoLSA.
Figure 4:
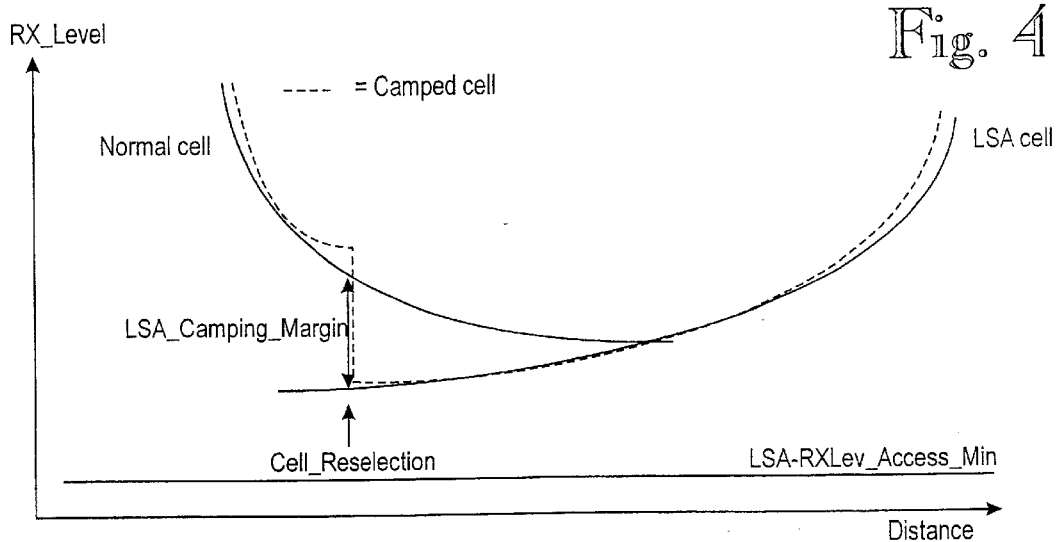
Figure 5:
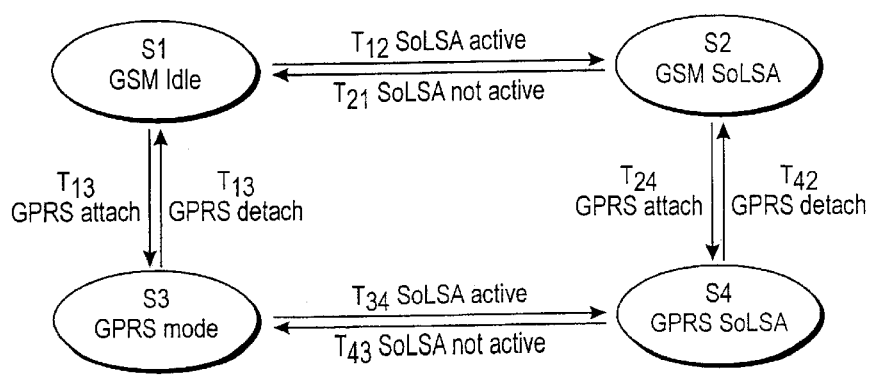
FIG. 5 is a state diagram illustrating the invention.

The invention can be applied to many kinds of cellular mobile communications systems. In the following, the invention will be described in greater detail by way of example mainly with reference to the pan-European digital GSM (Global System for Mobile Communication) system in connection with a GPRS system (General Packet Radio Service).

According to a preferred embodiment of the invention, the logic of GSM SoLSA is extended to GPRS SoLSA because such an extension does not require extensive modifications. This can be accomplished by using the criteria for GPRS when reselecting between two cells, only one of which supports LSA. The reason for this is that a given cell is more likely to support GSM than GPRS. If cell reselection was performed with GSM criteria the MS could camp to a cell which does not support GPRS. Reselecting the cell using GPRS criteria can be done e.g. by incorporating parameters like LSA_RXLev_Access_Min and LSA_Camping_Margin to C31 and C32. (In GSM SoLSA, LSA_RXLev_Access_Min and LSA Camping Margin were incorporated to C1 and C2, respectively.) Thus it is possible to use the same LSA quality parameters (LSA_RXLev_Access_Min and LSA_Camping_Margin) in both GSM and GPRS.

For added flexibility, however, it should be possible to maintain GPRS-specific versions of the LSA quality parameters LSA_Camping_Margin and LSA_RXLev_Access_Min. The benefit of the GPRS-specific versions of these parameters is that they can be made dependent on the quality requirements of the connection in question, such as the required quality of service, QoS.

According to a further preferred embodiment, the network controlled cell reselection is also taken into account when the SoLSA/GPRS interworking problem is solved. There are at least two possible approaches to this problem:

In the first approach, the BSC takes SoLSA into account. The BSC should include active mode support for SoLSA, as described above for GSM. Then the BSC could take SoLSA parameters into account, when reselecting cells. This approach requires major changes in the BSC.

In the second approach, the BSC simply ignores SoLSA. With this approach there are at least two options, the first one being the use of an exceptional case procedure already defined for GPRS. This gives the MS an opportunity to ignore the cell reselection order and inform the network (BSC) that it wants to stay in the SoLSA cell (or change into new SoLSA cell). This option requires only minor changes to the BSC. The second option is to falsify the measurement reports sent to the network, based on which the BSC makes the cell reselection. The MS uses the SoLSA parameters to modify the measurements so that SoLSA cells are more easily selected by the BSC. This approach requires no changes to the BSC, only to the MS.

It will be obvious to one skilled in the art that the basic idea of the invention can be implemented in many different ways. The invention and its embodiments are thus not limited to the examples described above but may be modified within the scope of the appended claims.

Abbreviations
BSC=Base Station Controller
CAMEL=Common Applications for Mobile Enhanced Logic
CI=Cell identifier
CSE=CAMEL Service Environment
EA=Exclusive Access
HCS=hierarchical cell structures
LAC=Location Area Code
LO=LSA Only access
LSA=Localized Service Area
MCC=Mobile Country Code
MNC=Mobile Network Code
MO/MT=Mobile Originating/Mobile Terminating
MSC=Mobile services Switching Centre
PA=Preferential Access
SAT=SIM Application Toolkit
SoLSA=Support of LSA

What is claimed is:

1. A method for controlling the operation of a mobile station, the operation comprising camping, characterized in that the camping is modellable as a number of states (S1 to S4) with predetermined state transitions (S12–S34) between them, wherein:

each one of the states corresponds to a set of locally varying features which the mobile station currently supports, the features comprise a first feature indicating whether the mobile station is in circuit-switched mode or packet switched mode, and a second feature indicating whether or not the mobile station is in localised service area (LSA) mode, and for all combinations of the first and second features, there is a corresponding state (S1 to S4), and for each one of these states there are two originating state transitions and two terminating state transitions, each one of the originating state transitions corresponding to a change in the respective feature.

2. A method according to claim 1, characterized in that for state transitions corresponding to a change in the LSA mode, there is a first set of criteria for circuit-switched mode and a second set of criteria for packet switched mode, and in situations where there is possible conflict between the first and second sets of criteria, the second set of criteria is used.

3. A method according to claim 2, wherein the mobile station operates in a telecommunications network comprising several cells, the method being characterized by comprising the steps of:

reselecting the cell the mobile station camps to based on the signal quality parameters (RXLevel) of the camped-to cell and its neighbouring cells, comparing the signal quality parameters to a predetermined minimum value (RXLevel_Access_Min), and favouring LSA cells in the comparing step by selecting a different minimum value (LSA_RXLevel_Access_Min) and/or modifying the signal quality parameters for LSA cells.

4. A method according to claim 1, characterized in that decisions regarding the state transitions are made in the mobile station.

5. A method according to claim 4, characterized in that that the mobile station, when in active mode, disregards a command from the network element to reselect a different cell, if obeying such a command would deactivate simultaneous support of LSA and packet mode.

6. A method according to claim 1, characterized in that decisions regarding the state transitions are made in a network element on the fixed side of the network, preferably a base station controller.

7. A method according to claim 6, characterized in that said network element is aware of the LSA cells relating to the mobile station in question.

8. A method according to claim 6, characterized in that that the mobile station reports the signal quality parameters to the network and falsifies the parameters so that the network element making the decision favours LSA cells with packet mode support.

9. A method according to claim 1, characterized in that information about LSA areas is stored in the mobile station.

10. A method according to claim 1, characterized in that information about LSA areas is stored in a network element of the fixed network.

11. A transceiver (MS, BTS/BSC) which is adapted to perform or support camping in a telecommunications system, characterized in that the camping is modellable as a number of states (S1 to S4) with predetermined state transitions ($S_{12}$–$S_{34}$) between them, wherein:

each one of the states corresponds to a set of locally varying features which the mobile station currently supports, the features comprise a first feature indicating whether the mobile station is in circuit-switched mode or packet switched mode, and a second feature indicating whether or not the mobile station is in localised service area (LSA) mode, and for all combinations of the first and second features, there is a corresponding state (S1 to S4), and for each one of these states there are two originating state transitions and two terminating state transitions, each one of the originating state transitions corresponding to a change in the respective feature.

12. The transceiver of claim 11, characterized in that it is adapted to store information about LSA areas.

13. The transceiver of claim 11, characterized in that it is a mobile station (MS).

14. The transceiver of claim 11, characterized in that it is a part (BTS/BSC) of a land-based mobile network.

* * * * *